May 16, 1950    R. F. WOLL ET AL    2,508,207
MOTOR VENTILATION
Filed Jan. 25, 1947

WITNESSES:
Edward Michaels
Wm. C. Groome

INVENTORS
Richard F. Woll &
Howard T. Walton.
BY O. B. Buchanan
ATTORNEY

Patented May 16, 1950

2,508,207

UNITED STATES PATENT OFFICE 2,508,207

MOTOR VENTILATION

Richard F. Woll, Buffalo, N. Y., and Howard T. Walton, Pittsburgh, Pa., assignors to Westinghouse Electric Corporation, East Pittsburgh, Pa., a corporation of Pennsylvania Application January 25, 1947, Serial No. 724,456

2 Claims. (Cl. 171—252)

1

Our invention relates to a simple, rugged, and economical solution of some of the problems of providing improved cooling-means for a line of squirrel-cage motors having an extensively redesigned mechanical and electrical structure, including somewhat novel heat-flow paths for withdrawing the heat from the motor. The cooling problems of the redesigned line of motors are more pronounced in the larger sizes, especially in the fan-cooled motors.

A principal object of our invention is to provide an improved ventilating-system for a motor which utilizes square stator laminations or punchings, having rounded corners which fit within a stator frame-ring, and having ventilating-holes punched in the round corners of these stator-laminations, in the direct heat-flow path from the stator-punchings to the frame-ring, and thence to the ambient atmosphere.

Figure 1:
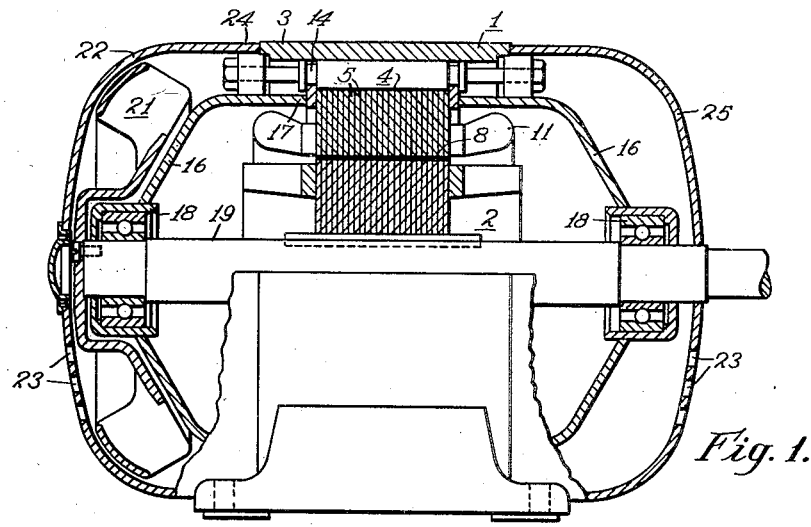
Figure 2:
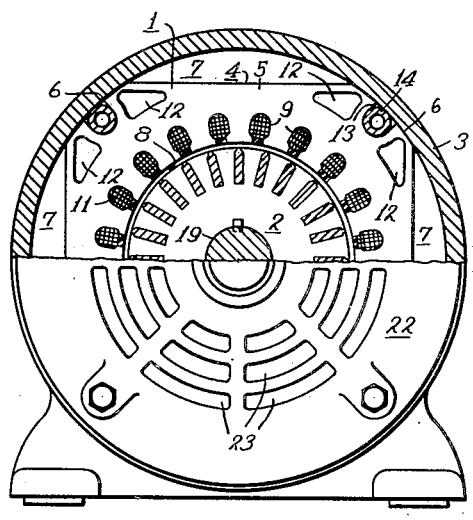

With the foregoing and other objects in view, our invention consists in the parts, structures, combinations and systems hereinafter described and claimed, and illustrated in the accompanying drawing, wherein Figure 1 is a longitudinal sectional view illustrative of an embodiment of our invention in a fan-cooled motor of one of the larger sizes, and Fig. 2 is an end view, with parts in section.

The particular kind of dynamo-electric machine which we have chosen for the illustration of our invention is a fan-cooled motor comprising a stator-member 1 and a rotor-member 2. The stator-member has a rigid cylindrical framering 3 which constitutes an imperforate enclosure-ring for the machine. The stator-member also includes a stator-core 4, which is supported by the frame-ring 3, and which comprises a stack of approximately square laminations or punchings 5, having rounded corners 6 which fit within the frame-ring 3. The four sides of the square thus define four axially extending external-ventilation stator-ducts 7, which admit of an axial airflow over the stator-core from one end of the core to the other.

The stator-laminations 5 have a bore 8 at the airgap of the machine, and they have winding-receiving slots 9 at the bore, for receiving the coil-sides of the stator-winding 11.

In accordance with our invention, the stator-laminations 5 are all similarly punched, in their rounded corners 6, to provide a plurality of stacked sets of aligned ventilating-holes 12, each of which is entirely surrounded by the magnetic material of the punchings or laminations, thus providing a plurality of axially extending punched ventilation stator-ducts 12 which admit of an

2 axial airflow through the stator-core back of the flux-carrying portion thereof.

The particular motor-design shown in the drawing utilizes a stator-core corner-construction which includes a notch 13, in each of the rounded corners 6, for receiving a clamping-bar 14 for holding the core-punchings together; and the punched ventilation stator-ducts 12 are disposed, one on either side of the notch 13, in each of the rounded corners 6.

A suitable end-bracket structure is provided, for mounting the rotor-member 2 for rotation within the bore 8 of the stator-core 4. In the particular form of embodiment which is illustrated in the drawing, the motor is a fan-cooled motor, having two imperforate brackets or end-closure members 16, one at each end of the machine. Each imperforate bracket 16 has a peripheral portion 17 which is in a substantially air-sealing relation to the end of the stator-core 4 at a diameter surrounding the stator-winding 11 but inside of the punched ventilation stator-ducts 12. In the illustrated form of embodiment, the imperforate brackets 16 carry centrally disposed bearings 18 for rotatably supporting the rotor-shaft 19.

In order to provide a blower-means for causing an end-to-end airflow through the several external and punched ventilation stator-ducts 7 and 12, the illustrated form of embodiment of our invention includes a fan or blower 21 which is carried by the rotor-shaft 19 outside of one of the imperforate brackets 16; and this fan or blower is surrounded or enclosed by a perforated hood 22, having ventilating holes 23 therein, and having a peripheral portion 24 which is in a substantially air-sealing relation to the end of the frame-ring 3. Usually, for the purpose of appearances, as well as for the purpose of providing adequate cooling for the bearings 18 at the other end of the machine, a second perforated hood 25 is provided at the other end of the machine, matching the perforated hood 22 which has just been described.

In operation, the fan 21 provides a single-end ventilation-effect whereby air is blown axially through the machine, entering through the hood 22 and leaving through the other hood 25. In passing through the machine, the air passes partly through the external-ventilation stator-ducts 7 and partly through the punched ventilation stator-ducts 12. The air which passes through the external-ventilation ducts 7 comes into direct contact with the square sides of the periphery of the stator-core 2, so as to directly cool said core.

The air which passes through the punched ventilation ducts 12 serves to additionally cool the rounded corners 6 of the stator core. Our illustrated motor-design is a design in which a considerable portion of the heat which is generated within the motor must be transmitted through these rounded corners 6 of the square punchings 5, so that a considerable amount of heat will flow from the stator-core 4 into the frame-ring 3, from which the heat will be dissipated by radiation both to the outside surrounding air and to the air which is blown by the motor-fan 21 through the external-ventilation stator-ducts, between the flat or square sides of the stator-core 4 and the frame 3. It is obvious that, in order for the heat to enter the frame, it must be conducted through the rounded corners 6 of the laminations which are in contact with the frame. Hence, by locating our punched ventilating holes 12 in these rounded corners, we provide additional radiating-surface for removing heat from these major heat-flow paths, thus effecting improved heat-dissipation.

From the standpoint of the electrical design of the machine, it will be noted that the punched ventilation holes 12 are disposed in portions of the stator-laminations 5 which are at a greater radial distance back, from the bore 8, than the flat sides of the square laminations, so that the magnetic material which is removed by the punching of the holes 12 does not materially affect the magnetic reluctance of the stator-core, because most of the stator-flux flows circumferentially around the stator-core, back of the stator-slots 9, without extending out into the rounded corners 6 of the square laminations 5. The punched ventilation ducts 12 thus add considerably to the radiating surface of the machine, besides increasing the total cross-sectional duct-area for air to flow through the machine, from one end of the machine to the other.

While we have illustrated our machine in a single illustrative form of embodiment, which is believed to be typical, we wish it to be understood that our invention is not limited to any particular size or type of machine, and we desire that our appended claims shall be accorded the broadest construction consistent with their language.

We claim as our invention:
1. A dynamo-electric machine, comprising a stator-member and a rotor-member; said stator-member having a rigid cylindrical frame-ring constituting an imperforate enclosure-ring, and a stator-core supported by the frame-ring; said stator-core comprising a stack of approximately square laminations having rounded corners fitting within said frame-ring, the four sides of the square thus defining as many axially extending external-ventilation stator-ducts which admit of an axial airflow over the stator-core from one end of the core to the other, the laminations having a bore at the airgap of the machine, the laminations having winding-receiving slots at the bore, the laminations further being all similarly punched in the rounded corners thereof to provide a plurality of stacked sets of aligned ventilating-holes, each of which is entirely surrounded by the magnetic material of the laminations, thus providing a plurality of additional axially extending ventilation stator-ducts which admit of an axial airflow through the stator-core back of the flux-carrying portion thereof; means for mounting the rotor-member for rotation within the bore of the stator-core; and blower-means for causing an end-to-end airflow through the several external and additional ventilation stator-ducts.

2. A fan-cooled dynamo-electric machine as defined in claim 1, the machine having two imperforate brackets, one at each end, each imperforate bracket having a peripheral portion in a substantially air-sealing relation to the end of the stator-core at a diameter surrounding the stator-winding but inside of the internal-ventilation stator-ducts, the blower-means including a fan carried by the rotor-shaft outside of one of said imperforate brackets, and a perforated hood surrounding said fan and having a peripheral portion in a substantially air-sealing relation to the end of the frame-ring.

RICHARD F. WOLL.
HOWARD T. WALTON.

REFERENCES CITED

The following references are of record in the file of this patent:

UNITED STATES PATENTS

| Number | Name | Date |
|---|---|---|
| 1,159,224 | Hoock | Nov. 2, 1915 |
| 1,267,838 | Bergman | May 28, 1918 |
| 1,882,487 | DuPont | Oct. 11, 1932 |

FOREIGN PATENTS

| Number | Country | Date |
|---|---|---|
| 16,300 | Great Britain | 1905 |